United States Patent
Harima

[11] Patent Number: 5,910,098
[45] Date of Patent: Jun. 8, 1999

[54] BRAKE SYSTEM OF AN ENGINE

[75] Inventor: Kenji Harima, Susono, Japan

[73] Assignee: Toyota Jidosha Kabushiki Kaisha, Aichi, Japan

[21] Appl. No.: 08/947,258

[22] Filed: Oct. 8, 1997

[51] Int. Cl.[6] .................................................. F16D 31/02
[52] U.S. Cl. .................................................. 60/397; 60/413
[58] Field of Search .............................. 60/397, 413, 285, 60/286

[56] References Cited

U.S. PATENT DOCUMENTS

| | | | |
|---|---|---|---|
| 1,797,853 | 3/1931 | Bragg et al. | 60/413 X |
| 1,797,977 | 3/1931 | Folberth et al. | 60/397 X |
| 2,379,719 | 7/1945 | Kane, Jr. | 60/397 X |
| 2,705,870 | 4/1955 | Holton | 60/397 |
| 2,857,988 | 10/1958 | Stelzer | 60/413 X |
| 2,910,327 | 10/1959 | Blair | 60/413 X |
| 4,193,264 | 3/1980 | Takahashi et al. | 60/397 |
| 4,554,786 | 11/1985 | Takeuchi et al. | 60/397 |
| 4,738,112 | 4/1988 | Nomura et al. | 60/397 X |
| 5,501,074 | 3/1996 | Suetsugu et al. | 60/285 |

FOREIGN PATENT DOCUMENTS

| | | | |
|---|---|---|---|
| 2425911 | 12/1974 | Germany | 60/397 |
| 57-164854 | 10/1982 | Japan | 60/397 |
| 59-188055 | 10/1984 | Japan . | |
| 59-196942 | 11/1984 | Japan . | |
| 63-223355 | 9/1988 | Japan . | |
| 5-44536 | 2/1993 | Japan . | |
| 7-19086 | 1/1995 | Japan . | |
| 7-119511 | 5/1995 | Japan . | |

*Primary Examiner*—John E. Ryznic
*Attorney, Agent, or Firm*—Kenyon & Kenyon

[57] ABSTRACT

A brake system of an engine comprising a brake booster. A restricted portion is formed in an intake passage upstream of a throttle valve and mass flow meter. A vacuum takeout port opens in the restricted portion. The vacuum generated in the restricted portion is led through a check valve to the brake booster. At the time of operating of the brake booster, the air ejected from the vacuum takeout port is measured by the mass flow meter as part of the intake air.

14 Claims, 7 Drawing Sheets

BRAKE SYSTEM OF AN ENGINE

BACKGROUND OF THE INVENTION

1. Field of the Invention

The present invention relates to a brake system of an engine.

2. Description of the Related Art

In the past, brake boosters have been used to increase the braking force. Such a brake booster basically is provided with a first chamber and a second chamber separated by a power piston. The first chamber is connected to a vacuum takeout port provided at a vacuum generating region in the engine intake passage. When the braking action is not being performed, the second chamber is connected with the first chamber, therefore at this time a vacuum is led from the vacuum takeout port into the first and second chambers chamber. On the other hand, when the brake pedal is depressed, the connection between the first chamber and the second chamber is broken and, simultaneously, the second chamber is opened to the atmosphere. Therefore, at this time, a large pressure difference is generated between the first chamber and the second chamber. The power piston is driven by this pressure difference whereby a large braking force is generated.

Next, when the brake pedal is released, the second chamber is closed off from the atmosphere and the second chamber is once again connected to the first one. As a result, the vacuum which is generated in the intake passage is once again led to the second chamber from the vacuum takeout port. In other words, at this time, air is rapidly ejected from the vacuum takeout port into the intake passage. In internal combustion engines where an air flow meter is provided at the inlet of the intake passage and the amount of fuel injection is calculated based on the amount of intake air detected by this air flow meter, if air is supplied from the vacuum takeout port in the intake passage downstream of this air flow meter, the air-fuel ratio will fluctuate. At this time, if, as explained above, air is rapidly ejected from the vacuum takeout port, the air-fuel ratio will widely fluctuate.

Therefore, to restrain the fluctuation of the air-fuel ratio due to the action of the air ejected from the vacuum takeout port when the brake pedal is released, there is known an internal combustion engine which increases the amount of the fuel injection when the brake pedal is released (see Japanese Unexamined Patent Publication (Kokai) No. 7-19086) and an internal combustion engine which ejects air a little at a time from the vacuum takeout port when the vehicle speed is low when the brake pedal is released (see Japanese Unexamined Patent Publication (Kokai) No. 7-119511).

In practice, however, it is difficult to increase the injection of fuel by the necessary amount in complete synchronization with the action of ejection of air from the vacuum takeout port. Therefore, in the internal combustion engine disclosed in Japanese Unexamined Patent Publication (Kokai) No. 7-19086, there is the problem that the air-fuel ratio fluctuates by a considerable extent. Further, in the internal combustion engine disclosed in Japanese Unexamined Patent Publication (Kokai) No. 7-119511, there is the problem that when the vehicle speed is high, air is rapidly ejected from the vacuum takeout port and therefore the air-fuel ratio fluctuates by a considerable degree even in such an engine.

SUMMARY OF THE INVENTION

An object of the present invention is to provide a brake system of an engine capable of preventing an air-fuel ratio from fluctuating greatly.

According to a first aspect of the present invention, there is provided an engine having an intake passage comprising detecting means arranged in the intake passage for detecting an amount of air fed into a cylinder of the engine; a vacuum generating region formed in the intake passage upstream of said detecting means; and a brake booster operated by vacuum and connected to a vacuum takeout port which is open to said vacuum generating region for operating said brake booster.

According to a second aspect of the invention, there is provided an engine having an intake passage comprising detecting means arranged in the intake passage for detecting an amount of air fed into a cylinder of the engine; a vacuum generating region formed in the intake passage; a vacuum tank connected to said vacuum generating region via a restricted opening; and a brake booster operated by vacuum and connected to said vacuum tank for operating said brake booster.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

Figure 1:
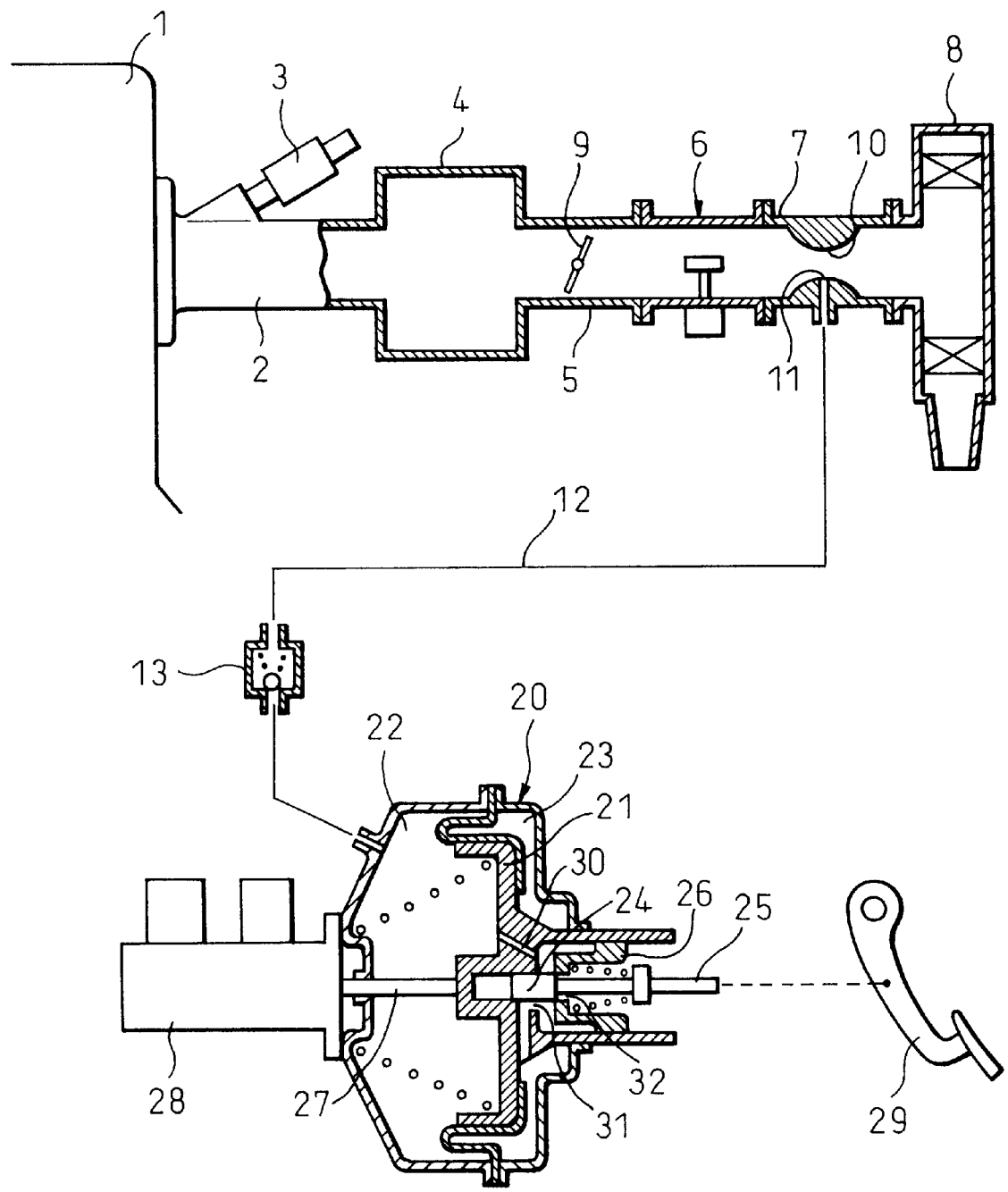
FIG. 1 is a side sectional view of a first embodiment of an intake system and brake booster of an internal combustion engine.

Referring to FIG. 1, reference numeral 1 is an engine, 2 is an intake tube connected to an intake port provided for each cylinder, 3 is a fuel injector attached to an intake tube 2, and 4 is a surge tank. The surge tank 4 is connected through an intake duct 5, mass flow meter 6, and intake duct 7 to an air cleaner 8. Inside the intake duct 5 is arranged a throttle valve 9. The mass flow meter 6 is for example comprised of a mass flow meter using a heating type platinum thin film. The mass flow meter 6 generates an output voltage proportional to the mass flow rate of the intake air. In the embodiment shown in FIG. 1, the amount of fuel injection is calculated from the mass flow rate detected by the mass flow meter 6 and the engine speed.

On the other hand, the brake booster 20 is provided with a power piston 21, a first chamber 22 and a second chamber 23 formed at the two sides of the power piston 21, an actuating rod 25 provided with a plunger 24, and a working valve 26. The power piston 21 has a push rod 27 affixed to it. The push rod 27 drives a master cylinder 28 generating a brake fluid pressure. Further, the actuating rod 25 is connected to a brake pedal 29.

In the embodiment shown in FIG. 1, a restricted portion 10 comprised of a venturi is formed in the intake duct 7. In this restricted portion 10, a vacuum takeout port 11 is formed. This vacuum takeout port 11 is connected to the first chamber 22 of the brake booster 20 through a vacuum conduit 12. Inside the vacuum conduit 12 is arranged a check valve 13 allowing passage only from the first chamber 22 to the vacuum takeout port 11. When the engine starts operating, a vacuum is generated inside the restricted portion 10. When a vacuum larger than the vacuum in the first chamber 22 is generated in the restricted portion 10, the check valve 13 opens, so the vacuum in the first chamber 22 is maintained at the maximum vacuum generated in the restricted portion 10.

As shown in FIG. 1, when the brake pedal 29 is released, the first chamber 22 and the second chamber 23 are communicated with each other through a pair of communicating passages 30 and 31. Therefore, the same vacuum is generated in the first chamber 22 and the second chamber 23. When the brake pedal 29 is next depressed, the working valve 26 moves to the left along with the actuating rod 26. As a result, the communicating passage 30 is shut by the working valve 26 and the plunger 24 moves away from the working valve 26, so the second chamber 23 is opened to the atmosphere through the atmospheric communicating passage 32 and the second chamber 23 becomes atmospheric pressure. Therefore, a pressure difference is generated between the first chamber 22 and the second chamber 23. This pressure difference moves the power piston 21 to the left.

On the other hand, when the brake pedal is released, the plunger 24 closes the atmospheric communicating passage 32 and the communicating passages 30 and 31 are opened, so the vacuum in the first chamber 22 is led through the communicating passages 30 and 31 to the second chamber 23. In other words, the air in the second chamber 23 is ejected through the first chamber 22 and the check valve 13 from the vacuum takeout port 11.

In the embodiment shown in FIG. 1, however, the air ejected from the vacuum takeout port 11 is measured as part of the intake air by the mass flow meter 6 and the amount of fuel injection is calculated based on the mass flow rate including the mass flow rate of the ejected air, so even if air is ejected from the vacuum takeout port 11, the air-fuel ratio is maintained at the target air-fuel ratio without fluctuating.

Figure 2:
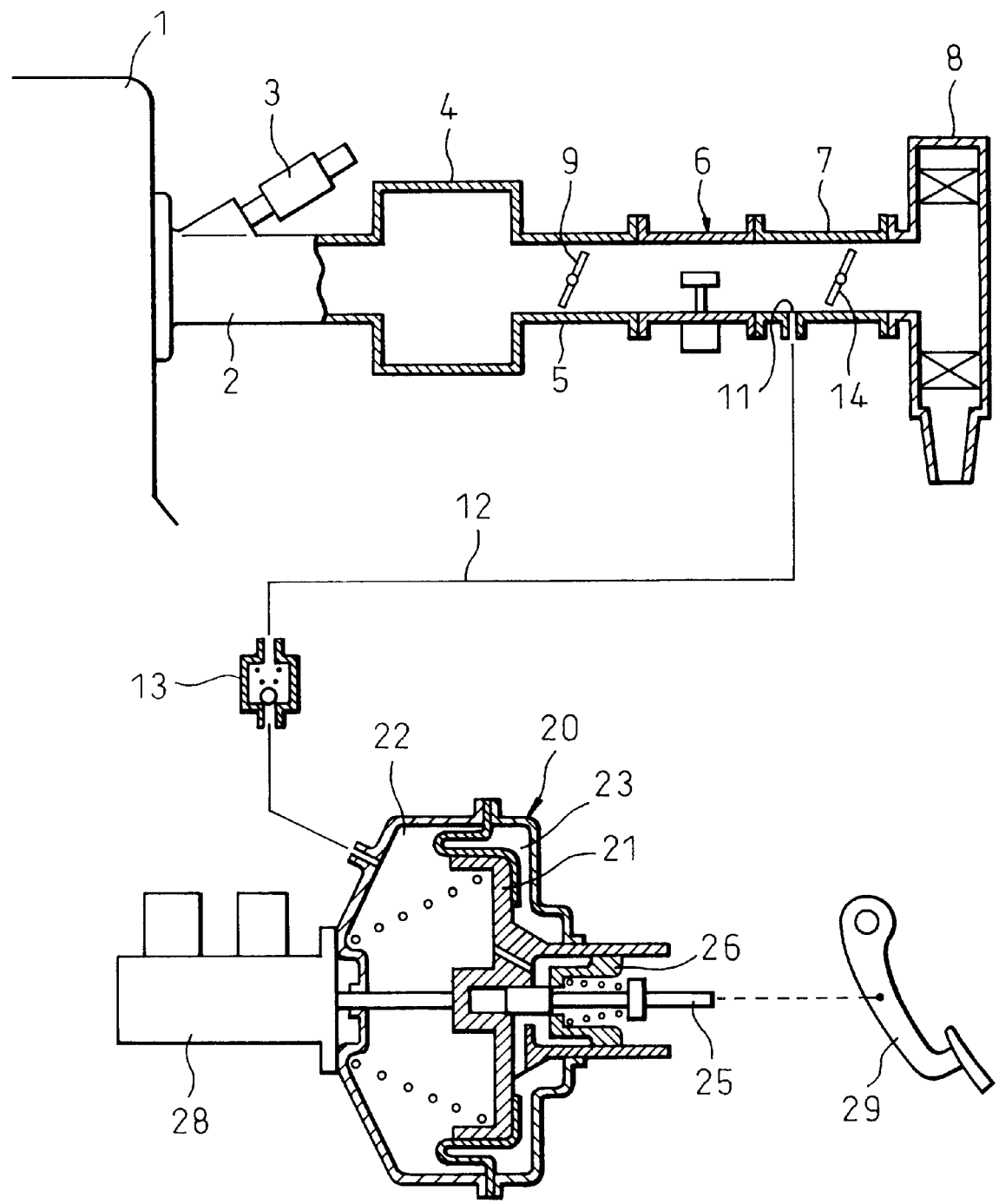
FIG. 2 is a side sectional view of a second embodiment of an intake system and brake booster of an internal combustion engine.
Figure 3:
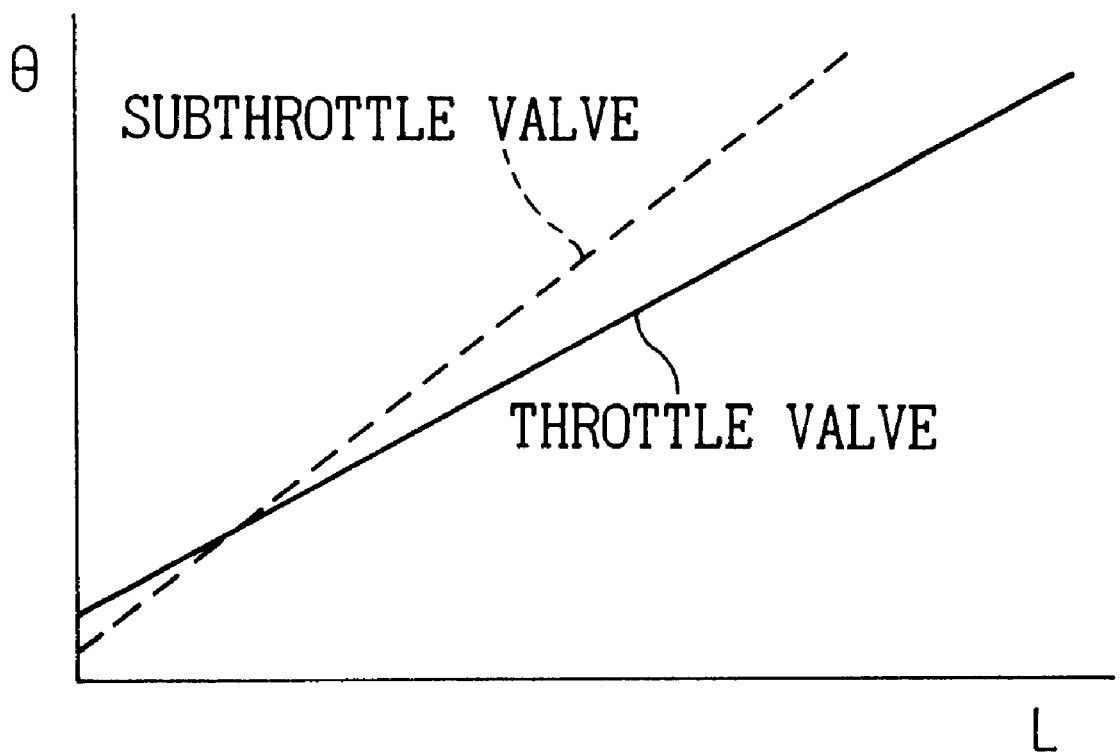
FIG. 3 is a view of the opening degree of a throttle valve and a subthrottle valve.

FIG. 2 shows a second embodiment. In this embodiment, a subthrottle valve 14 is arranged in the intake duct 7 upstream of the mass flow meter 6. The vacuum takeout port 11 is arranged in the intake duct 7 upstream of the mass flow meter 6 and downstream of the subthrottle valve 14. The opening degree θ of the throttle valve 9 and the subthrottle valve 14 is changed in accordance with the amount of depression L of the accelerator as shown in FIG. 3 for example. In this embodiment, the vacuum in the first chamber 22 of the brake booster 20 is maintained at the maximum vacuum generated in the intake duct 7 downstream of the subthrottle valve 14. Further, in this embodiment as well, the air ejected from the vacuum takeout port 11 is measured as part of the intake air by the mass flow meter 6, so even if air is ejected from the vacuum takeout port 11, the air-fuel ratio will not fluctuate.

Figure 4:
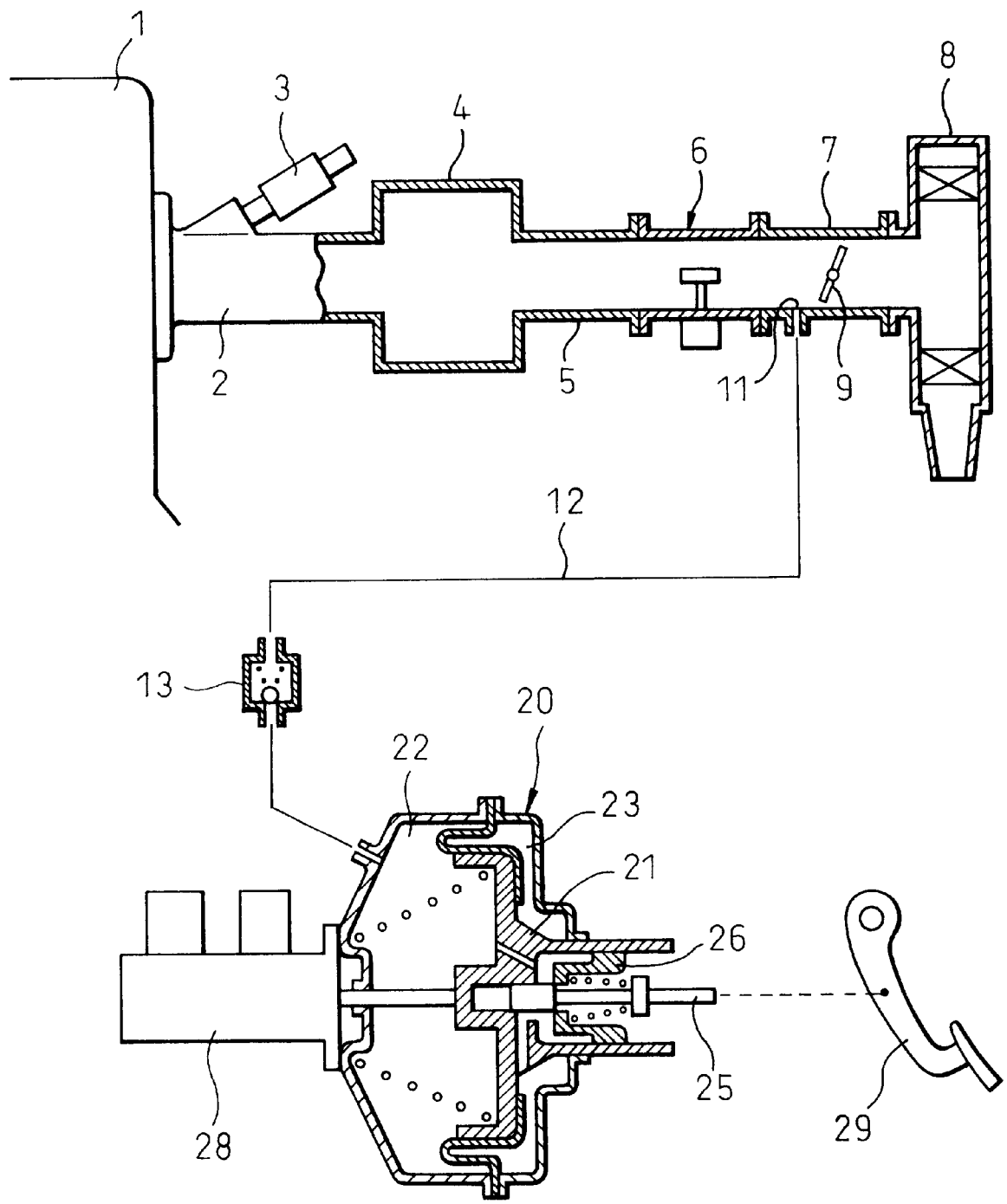
FIG. 4 is a side sectional view of a third embodiment of an intake system and brake booster of an internal combustion engine.

FIG. 4 shows a third embodiment. In this embodiment, the throttle valve 9 is arranged in the intake duct 7 upstream of the mass flow meter 6 while the vacuum takeout port 11 is arranged in the intake duct 7 upstream of the mass flow meter 6 and downstream of the throttle valve 9. In this embodiment, the vacuum in the first chamber 22 of the brake booster 20 is maintained at the maximum vacuum generated in the intake duct 7 downstream of the throttle valve 9. Further, in this embodiment as well, the air ejected from the vacuum takeout port 11 is measured as part of the intake air by the mass flow meter 6, so even if air is ejected from the vacuum takeout port 11, the air-fuel ratio will not fluctuate.

Figure 5:
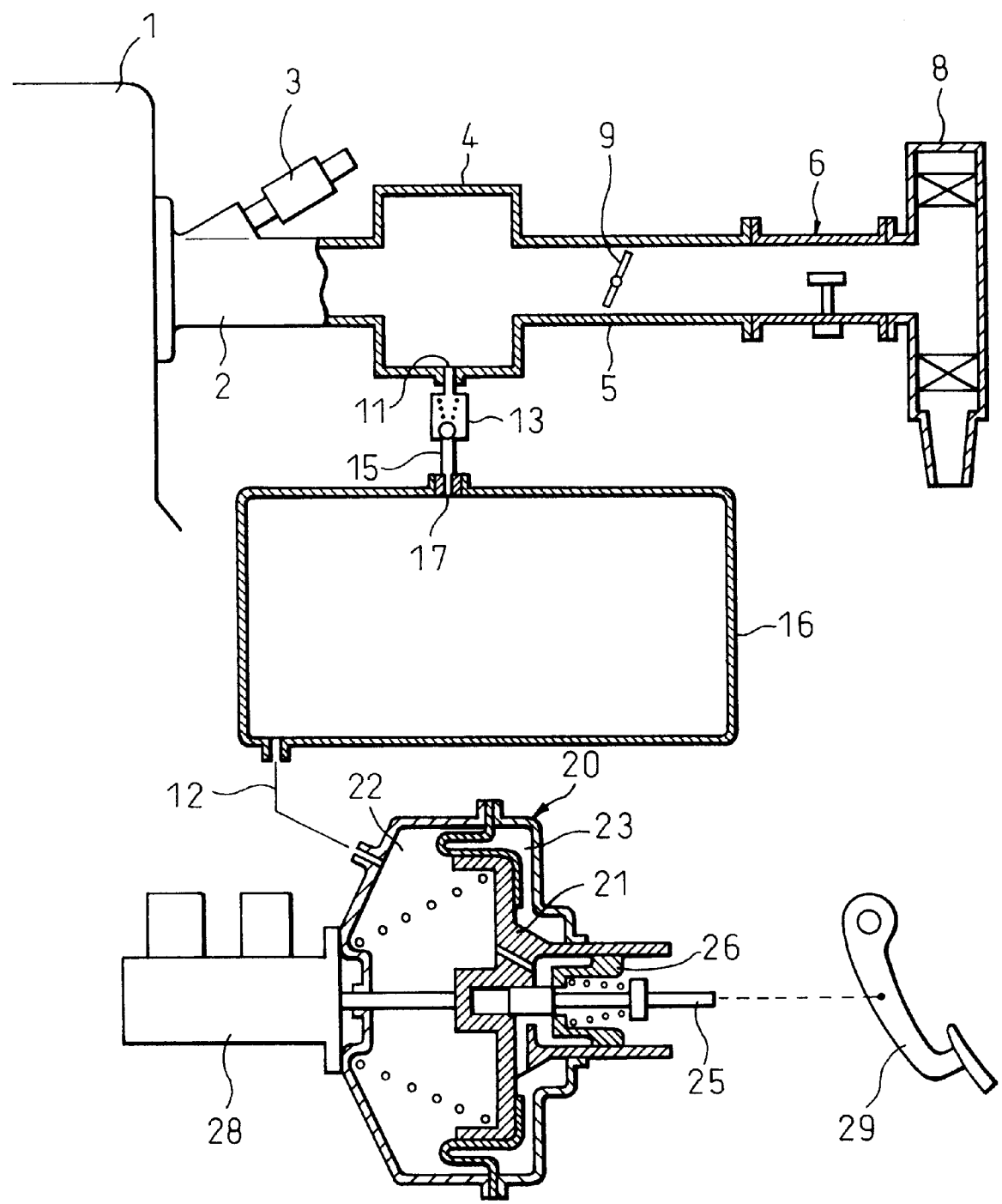
FIG. 5 is a side sectional view of a fourth embodiment of an intake system and brake booster of an internal combustion engine.

FIG. 5 shows a fourth embodiment. In this embodiment, the vacuum takeout port 11 is arranged in the surge tank 4 downstream of the mass flow meter 6 and the throttle valve 9. The vacuum takeout port 11 is connected through the vacuum conduit 15 to a vacuum tank 16. In the vacuum conduit 15 are arranged in series a check valve 13 allowing passage only from the inside of the vacuum tank 16 to the surge tank 4 and a restricted opening 17. Further, the vacuum tank is connected through a vacuum conduit 12 to the first chamber 22 of the brake booster 20.

In this embodiment, when the vacuum in the vacuum tank 16 becomes smaller than the vacuum in the surge tank 4, the check valve 13 opens. At this time, the air in the vacuum tank 16 flows out through the restricted opening 17 into the surge tank 4 gradually, so the vacuum in the vacuum tank 16 gradually increases. The amount of outflow of air from the vacuum takeout port 11 at this time is small, so the air-fuel ratio does not fluctuate that much due to the outflowing air. On the other hand, when the brake pedal 29 is released, the air is ejected from the first chamber 22 to the inside of the vacuum tank 16, but even at this time, the amount of air flowing out from the vacuum tank 16 to the surge tank 4 is kept small in amount. Therefore, in this embodiment, even if the brake pedal is released, it is possible to keep the air-fuel ratio from fluctuating.

Figure 6:
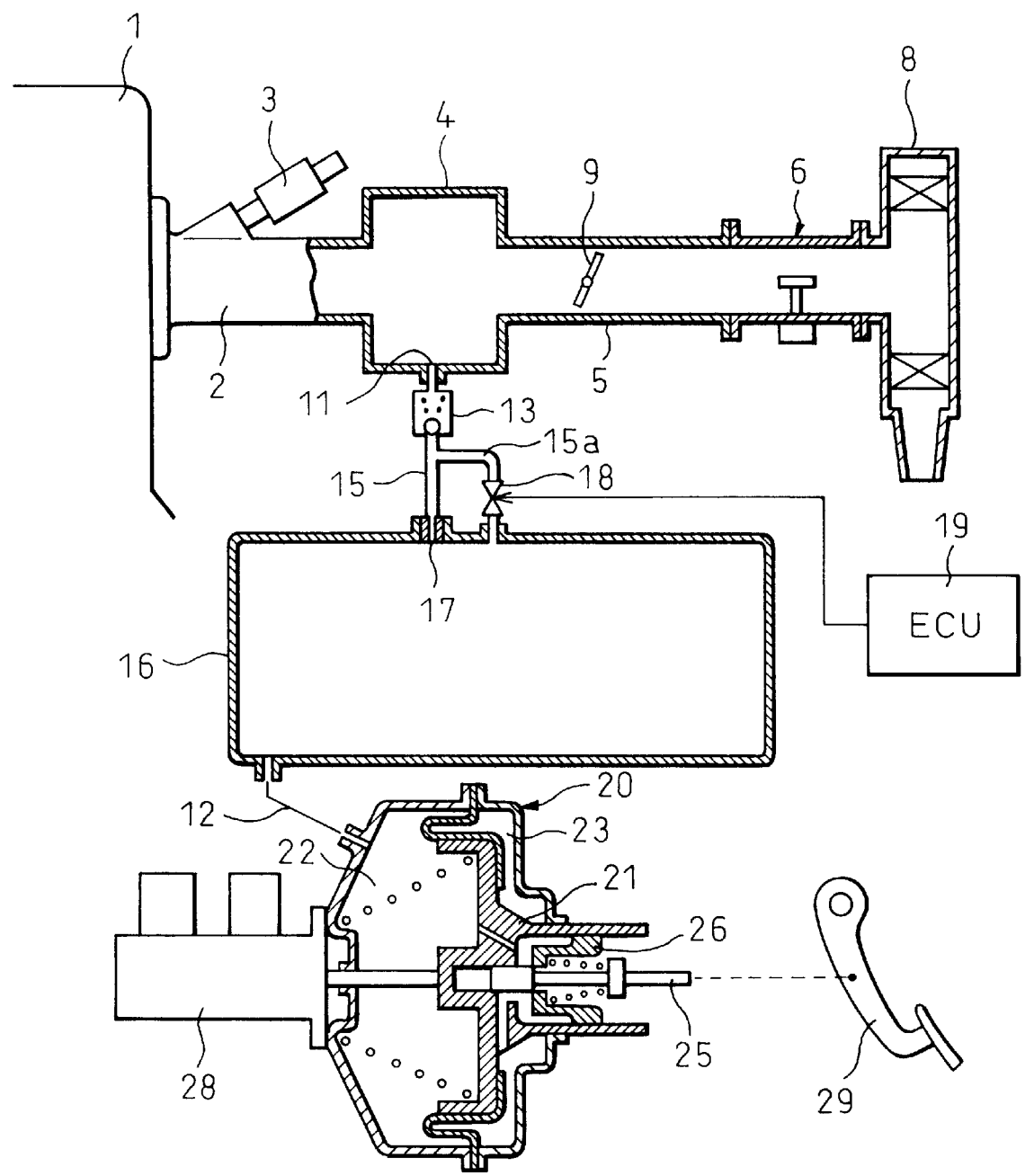
FIG. 6 is a side sectional view of a fifth embodiment of an intake system and brake booster of an internal combustion engine.
Figure 7:
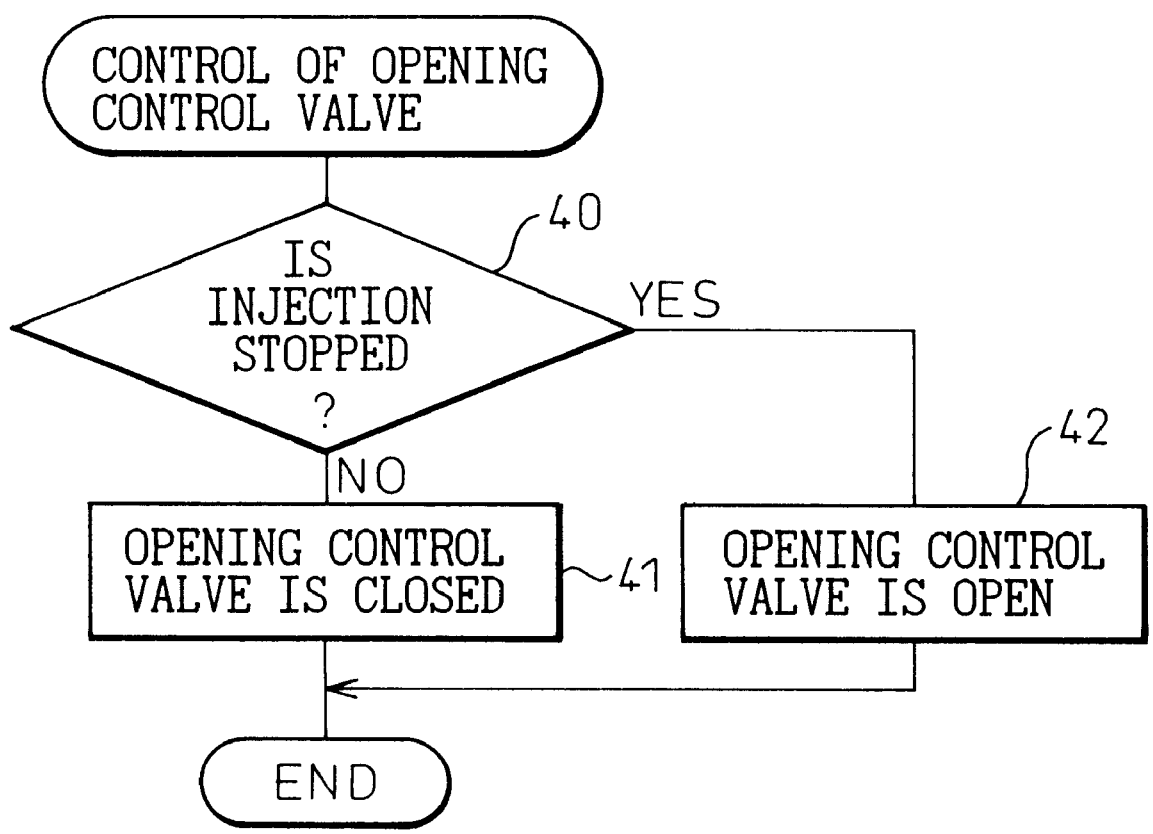
FIG. 7 is a flow chart of the control of the opening control valve.

FIG. 6 shows a fifth embodiment. In this embodiment, a bypass passage 15a which bypasses the restricted portion 17 is arranged in parallel with the restricted portion 17. In this bypass passage 15a is arranged an opening control valve 18 which is controlled based on an output signal of an electronic control unit 19. This opening control valve 18 is controlled in accordance with the flow chart shown in FIG. 7. That is, first, it is judged if the injection of fuel has been stopped at the time of a deceleration operation. When the fuel injection has not been stopped, the routine proceeds to step 41, where the opening control valve 18 is closed, while when the fuel injection has been stopped, the routine proceeds to step 42, where the opening control valve 18 is opened. That is, in this embodiment, when the fuel injection is stopped at the time of a deceleration operation, the opening control valve 18 is opened.

When the opening control valve 18 is closed, a air flow action similar to FIG. 5 is caused, therefore the air-fuel ratio is kept from fluctuating at this time. On the other hand, when the throttle valve 9 is closed, a deceleration operation is started, and the fuel injection stopped, the opening control valve 18 is opened. If the opening control valve 18 is opened, the vacuum in the vacuum tank 16 becomes larger all at once up to the large vacuum generated in the surge tank 4. At this time, a large amount of air is ejected rapidly into the surge tank 4 from the vacuum takeout port 11, but the fuel injection is stopped at this time so there is no fluctuation of the air-fuel ratio at all.

According to the present invention, it is possible to prevent or restrain fluctuations in the air-fuel ratio even if air is ejected from the vacuum takeout port.

While the invention has been described by reference to specific embodiments chosen for purposes of illustration, it should be apparent that numerous modifications could be made thereto by those skilled in the art without departing from the basic concept and scope of the invention.

I claim:

1. An engine having an intake passage comprising:

detecting means arranged in the intake passage for detecting an amount of air fed into a cylinder of the engine;

and a brake booster operated by vacuum and connected to a vacuum takeout port which opens into a vacuum generating region of the intake passage wherein, the vacuum takeout port opens into the intake passage upstream of the detecting means.

2. An engine as set forth in claim 1, further comprising:

a vacuum conduit connecting said brake booster and said vacuum takeout port; and a check valve arranged in said vacuum conduit so that air may flow through said vacuum conduit only from said brake booster to said vacuum takeout port.

3. An engine as set forth in claim 1, wherein said brake booster is provided with a power piston connected to a master cylinder for generating brake fluid pressure, and including a first chamber formed at one side of the power piston and a second chamber formed at the other side of the power piston, wherein the first chamber is connected to said vacuum takeout port, the engine further including valve means connected to a brake pedal, wherein said valve means connects the second chamber to the first chamber when the brake pedal is released and separates the second chamber from the first chamber and makes the pressure in the second chamber the atmospheric pressure when the brake pedal is depressed.

4. An engine as set forth in claim 1, wherein said detecting means is comprised of a mass flow meter which detects a mass flow rate of air supplied into a cylinder of the engine.

5. An engine as set forth in claim 1, wherein a restricted portion is formed in the intake passage upstream of said detecting means and said vacuum takeout port opens inside said restricted portion.

6. An engine as set forth in claim 5, wherein said restricted portion is a venturi.

7. An engine as set forth in claim 1, wherein a throttle valve is arranged in the intake passage downstream of said detecting means, a subthrottle valve is arranged in the intake passage upstream of said detecting means, and said vacuum takeout port opens in the intake passage upstream of said detecting means and downstream of the subthrottle valve.

8. An engine as set forth in claim 7, wherein an opening degree of the throttle valve and an opening degree of the subthrottle valve are controlled in accordance with an amount of depression of an accelerator pedal and wherein the opening degree of the throttle valve and the opening degree of the subthrottle valve are made smaller the smaller the amount of depression of the accelerator pedal.

9. An engine as set forth in claim 1, wherein a throttle valve is arranged in the intake passage upstream of said detecting means and said vacuum takeout port opens in the intake passage upstream of said detecting means and downstream of said throttle valve.

10. An engine having an intake passage comprising:

detecting means arranged in the intake passage for detecting an amount of air fed into a cylinder of the engine;

a vacuum generating region formed in the intake passage;

a vacuum tank connected to said vacuum generating region;

a brake booster operated by vacuum and connected to said vacuum tank; and means for judging whether a supply of fuel has been stopped during a deceleration operation of the engine, wherein said vacuum generating region and said vacuum tank are connected through an opening control valve, and said opening control valve is opened when the supply of fuel is stopped during the deceleration operation.

11. An engine as set forth in claim 10, wherein said brake booster is provided with a power piston connected to a master cylinder for generating brake fluid pressure, and including a first chamber formed at one side of the power piston and a second chamber formed at the other side of the power piston, wherein the first chamber is connected to said vacuum tank, the engine further including valve means connected to a brake pedal, wherein said valve means connects the second chamber to the first chamber when the brake pedal is released and separates the second chamber from the first chamber and makes the pressure in the second chamber the atmospheric pressure when the brake pedal is depressed.

12. An engine as set forth in claim 10, wherein said detecting means is comprised of a mass flow meter which detects a mass flow rate of air supplied into a cylinder of the engine.

13. An engine as set forth in claim 10, further comprising:

a vacuum conduit connecting said vacuum tank and said vacuum generating region via a restricted opening; and a check valve arranged in said vacuum conduit so that air may flow through said vacuum conduit only from said vacuum tank to said vacuum generating region.

14. An engine as set forth in claim 10, further comprising:

a vacuum conduit connecting said vacuum tank and said vacuum generating region via said opening control valve; and a check valve arranged in said vacuum conduit so that air may flow through said vacuum conduit only from said vacuum tank to said vacuum generating region.

* * * * *

UNITED STATES PATENT AND TRADEMARK OFFICE
CERTIFICATE OF CORRECTION

PATENT NO. : 5,910,098
DATED : June 8, 1999
INVENTOR(S) : Kenji Harima

It is certified that error appears in the above-identified patent and that said Letters Patent is hereby corrected as shown below:

On the title page, insert item [30]:

--Japanese Patent Application No. 8-270046, filed October 11, 1996.--

Signed and Sealed this

Twenty-seventh Day of March, 2001

Attest:

NICHOLAS P. GODICI

*Attesting Officer*  *Acting Director of the United States Patent and Trademark Office*